United States Patent [19]

Oliver

[11] Patent Number: 4,651,973
[45] Date of Patent: Mar. 24, 1987

[54] GATE VALVES

[76] Inventor: John P. Oliver, 37 Stillforest, Houston, Tex. 77024

[21] Appl. No.: 639,938

[22] Filed: Aug. 13, 1984

[51] Int. Cl.$^4$ .......................... F16K 3/316; F16K 31/50
[52] U.S. Cl. ................................... 251/267; 251/284; 251/327; 251/329
[58] Field of Search ............... 251/326, 327, 328, 329, 251/266, 267, 268, 269, 274, 284; 137/793, 454.2, 454.6

[56] References Cited

U.S. PATENT DOCUMENTS

| | | | |
|---|---|---|---|
| 273,271 | 3/1883 | Gibbons | 251/327 X |
| 643,476 | 2/1900 | Crozier | 251/327 X |
| 3,223,380 | 12/1965 | Hochmuth et al. | 251/327 X |
| 3,348,567 | 10/1967 | Volpin | 251/327 X |
| 3,768,774 | 10/1973 | Baugh | 251/327 X |
| 4,081,174 | 2/1978 | Johnson et al. | 251/327 |
| 4,436,283 | 3/1984 | Shore | 251/329 |
| 4,440,381 | 4/1984 | Tipton, Jr. | 251/329 X |

FOREIGN PATENT DOCUMENTS

| | | | |
|---|---|---|---|
| 187017 | 11/1887 | France | 251/266 |
| 321592 | 4/1902 | France | 251/266 |
| 600287 | 7/1925 | France | 251/266 |

*Primary Examiner*—Martin P. Schwadron
*Assistant Examiner*—Stephen M. Hepperle
*Attorney, Agent, or Firm*—Vaden, Eickenroht, Thompson & Boulware

[57] ABSTRACT

There is disclosed a gate valve having a cast body which is of sufficiently low height that the upper end of the gate remains partially within a cavity in the bonnet connected to the body as it moves between opened and closed positions. Guide surfaces are formed in the open end of the bonnet cavity for guiding the side edges of the gate as it is so moved. The stem is of a non-rising type having a ring mounted for rotation without reciprocation between upper and lower axial thrust bearings in the bonnet and connected to a one-piece stem by means of a pin which is adapted to shear in response to a predictable axial load on the stem.

3 Claims, 3 Drawing Figures

GATE VALVES

This invention relates generally to gate valves of the type which include a body having a flowway therethrough and a cavity which intersects the flowway and has a closed end and an open end, and a bonnet connectible to the body and having a stem mounted therein and connected to the gate for reciprocating the gate between opened and closed positions. In one of its aspects, it relates to improvements in gate valves of this type in which at least the body is formed of a casting. In another of its objects, it relates to improvements in gate valves of this type having a non-rising stem.

In a conventional valve of this type, the face of the body about the open end of its cavity and to which a face of the bonnet is connected is spaced a substantial distance from the flowway, and the gate remains substantially within the body cavity as it reciprocates between opened and closed positions. This requires a casting which is not only large and expensive, but also difficult to cast and/or to machine in order to receive the gate for guided reciprocation between seats received in pockets in the flowway at each side of the cavity. Thus, the overall valve is relatively expensive to manufacture, even when the bonnet is also cast. Also, because of the distance between the pockets and the face at the open end of the body cavity, the pockets are hard to inspect, and the seats are difficult to install and/or replace.

Thus, in order to guide the side edges of the gate, it is necessary to cast guide surfaces on the adjacent sides of the body cavity or to form and mount additional parts on the adjacent sides of the body cavity on which the guide surfaces are formed. In either case, the sides of the cavity on which the guide surfaces are formed are difficult to reach because of their distance from the open end of the cavity. Also, the guide surfaces restrict the flow of fluids within the cavity transferring from one end to the other, as the gate is reciprocated, and thus make the gate more difficult to operate. The fabrication and inspection of such valve bodies is even more difficult and expensive when stop surfaces must be formed on the closed end of its cavity to locate the gate in one of its positions.

Some valves of this type having non-rising stems are of a construction intended to prevent overloading the thrust bearings in the bonnet on which the stem is rotatably mounted. Thus, as shown and described, for example, on pages 7263–7265 of the 1980–81 issue of the *Composite Catalog of Oil Field Equipment and Services*, the stem may be formed of two parts, the upper of which has a flange held between the bearings and an upper end extending through the bonnet for connecting to a handwheel, and the lower of which has a nut on its lower end threadedly connected to a stem on the upper end of the gate. More particularly, the upper and lower stem parts are connected by a pin which is adapted to shear in responsive to excessive axial or torsional loads, so that, for example, if the gate becomes stuck, continued turning of the handwheel will shear the pin and thus permit the handwheel to turn freely without further loading the bearings.

Although desirable not only for the reasons above mentioned, but also because it prevents the stem from being twisted off, this stem arrangement is complicated and thus increases the overall cost of the valve as well as its assembly and disassembly. Also, it is unreliable since the pin shears in response to combined axial and torsional loads.

An object of this invention is to provide a gate valve of this type having a cast body which is less expensive to fabricate and in which the seat pockets are so located as to facilitate their inspection as well insertion and removal of the seats, and further in which lubricants are free to flow past the gate as it reciprocates.

Another object is to provide a valve of the type above described which is particularly advantageous when the bonnet of the valve is made of bar stock or otherwise easily machinable parts.

Still another object is to provide such a valve in which the gate is located in each of its limited positions without the need for stop parts on the closed end of the cast body.

A further object is to provide a non-rising stem valve of this type having a simple and inexpensive arrangement for preventing damage to the bearings in the bonnet in response to a predictable loading of the stem.

These and other objects are accomplished, in accordance with the illustrated embodiments of the present invention, by a gate valve of the type described in which both the cast body and the bonnet have cavities therein which are closed at one end and open at the other end, with the open end of the bonnet cavity facing the open end of the body cavity to form a continuation thereof, and wherein one end of the gate remains within the bonnet cavity as it moves between open and closed positions, and the open end of the cavity has surfaces thereon which guide the side edges of the gate as it is moved. Thus, the body is of a height considerably less than that of the conventional valves above described, and the end face of the body surrounding the open end of its cavity need be spaced from the flowway a distance only far enough to prevent breakthrough of the holes which receive bolts for connecting the end face about the open end of the bonnet cavity to the end face of the body. This short construction of the body also makes the pockets in which the seats are received more accessible to inspection and the seats easier to insert and remove from the pockets. Still further, formation of the guide surfaces on the bonnet, rather than the body, opens up the spaces between the end edges of the gate and the opposite sides of the body cavity for the free flow of lubricant as the gate is moved between opened and closed positions. More particularly, since the guide surfaces are formed on the open end of the bonnet cavity, they are easily machined or otherwise formed thereon, particularly when a bonnet is already chucked up for machining other surfaces on its end face.

In the preferred and illustrated embodiment of the invention, the body has a surface thereon which is adjacent the open end of its cavity, and there is a shoulder on the gate which engages this surface as the gate moves to its position more remote from the closed end of the bonnet cavity. Consequently, it is not necessary to provide special parts on the closed end of the body cavity for this purpose. As illustrated, the gate includes a slab in which the port is formed, which of course also contributes to the low profile of the gate.

The stem is of a non-rising type which is mounted within the bonnet for rotation without reciprocation, the gate includes a slab in which the port is formed, and the means for reciprocating the gate includes a stem nut on one end of the slab and threadedly connected to the stem. More particularly, the shoulder engageable with the surface on the open end of the body cavity is formed on the nut, thus simplifying the overall construction of the valve and reducing the number of its separate parts.

Along this same line, the open end of the body cavity has a cylindrical counterbore and the seat is formed on the end of the counterbore, and the open end of the bonnet has a cylindrical extension which fits closely within the counterbore. As will be understood, all of these parts are easily machined on the body and bonnet since they are at the open ends of their cavities. More particularly, end faces which surround the open ends of the cavities engage one another upon connection of the body and bonnet, a groove is formd in the body at the intersection of its end face and counterbore, and the seal ring is received in the groove to seal between the bonnet and body.

In accordance with another novel aspect of the present invention, the gate valve has a non-rising stem which is made of one piece having one end extending from the bonnet for connection to a rotary operator, and the other end threadedly connected to the stem. More particularly, a ring surrounds the stem and is mounted within the bonnet for rotation without reciprocation between axial thrust bearings in the bonnet, and a shear pin connects the ring to the stem for rotation therewith, whereby the pin is sheared to prevent excessive axial loading on the bearings. Not only does this arrangement result in a much simpler stem construction, but also protects the bearings in a more predictable manner since the pin shears only in response to axial loads. To protect the bearings against excessive torsional loads on the stem, the stem is of heavier construction than would ordinarily be used, and thus not susceptible to twisting off under ordinary handwheel operation.

In the drawings, wherein like reference characters are used throughout to designate like parts:

Figure 1:
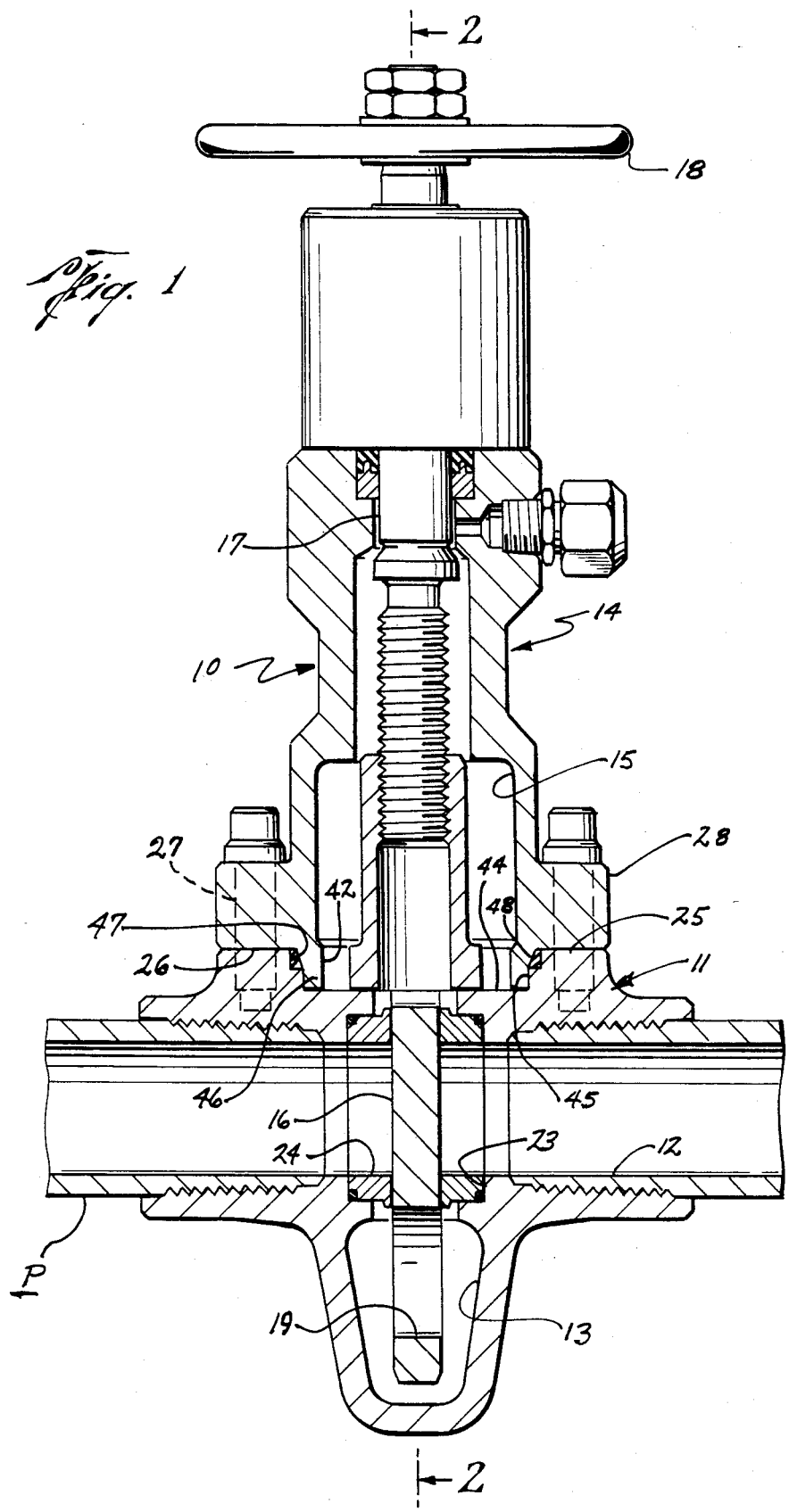
FIG. 1 is a vertical sectional view of the valve, with the gate in its lower closed position, and with the cap of the bonnet and handwheel shown in elevation.

With reference now to the details of the above-described drawings, the overall valve, which is indicated in its entirety by reference character 10, includes a valve body 11 having a flowway 12 therethrough and a cavity 13 therein having a closed lower end and an open upper end, together with a bonnet 14 having a cavity 15 therein which is closed at its upper end and open at its lower end to form a continuation of the open upper end of the body cavity 13. More particularly, the valve also includes a gate 16 which is reciprocable within the bonnet and body cavities between the opened and closed positions of FIGS. 2 and 1, respectively, and a stem 17 which is mounted within the bonnet has one end extending through the closed end of the bonnet for connection to a handwheel 18 and its lower end connected to the gate for moving the gate between opened and closed positions in response to rotation of the handwheel.

Figure 2:
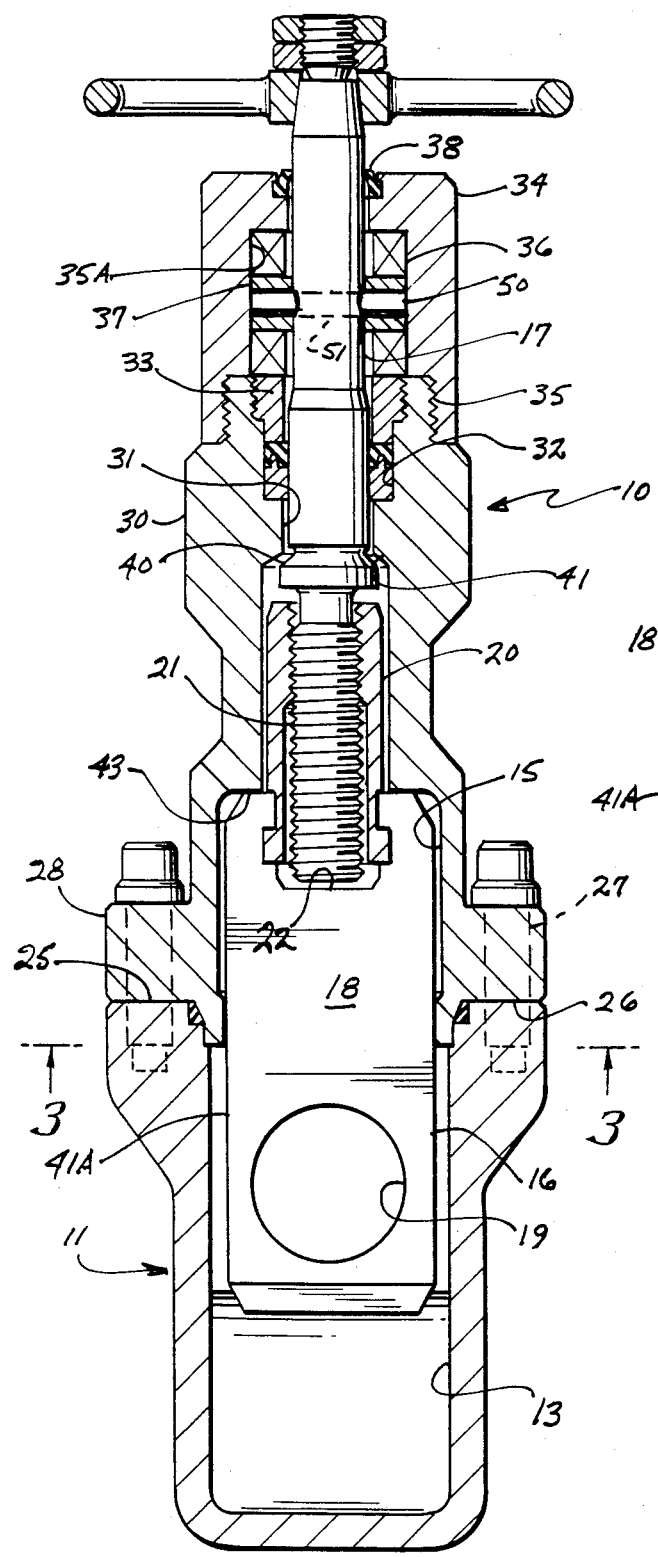
FIG. 2 is another vertical sectional view of the valve, as seen along broken lines 2—2 of FIG. 1, and showing the gate in its upper open position, and the cap as well as the handwheel in section.

As previously described, the stem is of a non-rising type which is mounted for rotation without reciprocation within the bonnet 14, and the gate 16 comprises a slab 18 having a port 19 therethrough which is aligned with the flowway 12 to open the valve when the gate is raised to the position of FIG. 2, and which is lowered into the lower end of the body cavity to dispose a solid portion thereof across the flowway 12 when the gate is lowered to the closed position of FIG. 1. As shown, the ends of the flowway are threaded for connection with pipe ends P which form a smooth continuation of the inner diameters of the seats and port 19 in the open position of the valve.

As also previously described, a pockets 23 is formed as a counterbore in the flowway at each side of its intersection with the body cavity 13, and a seat 24 is received within each pocket to engage at its inner end with opposite sides of the gate as the gate slides vertically between the seats.

A nut 20 is mounted on the upper end of the slab 18 and threadedly connected to the lower end 21 of the stem so that, with the slab of the gate held by the seats against rotation, handwheel operation will either raise or lower the slab. When the gate is raised to the open position of FIG. 2, the lower threaded end 21 of the stem is received within a recess 22 in the upper end of the slab.

An end face 25 is formed on the body 11 about the upper end of the cavity 13 therein, and an end face 26 is formed on the lower end of the bonnet about the open lower end of the cavity 15 within it. The bonnet is releasably connected to the body by means of bolts 27 which extend through holes in a flange 28 at the lower end of the bonnet and into sockets in the end face 25 of the valve body to pull the faces 25 and 26 into tight engagement with one another. It will be understood of course that in order to insert or remove the seats, it's first necessary to remove the bonnet as well as the gate and thus permit each seat to be moved outwardly from its pocket and then upwardly through the open upper end of the cavity 13.

The bonnet 14 includes a main body 30 on which the bolt flange 28 is formed, and having an opening 31 through its upper end to receive the stem 17. The opening 31 is counterbored at 32 to form a housing for a packing assembly 33 including a gland nut threadedly connected to the upper end of the counterbore to seal between the stem and bonnet as the stem rotates.

The bonnet also includes a cap 34 which is threadedly connected to a neck 35 at the upper end of the bonnet body 30, and has a hole through its upper end to permit the stem to extend therethrough and a recess 35A beneath the hole to form a housing to receive upper and lower thrust bearings 36 and a ring 37 carried about the stem and held for rotation between the bearings. As the cap moves downwardly into connection with the bonnet body, it holds the bearings assemblies and ring in close fitting relation above the packing assembly within the housing in the bonnet housing. A wiper ring 38 carried in a groove in the upper end of the hole through the cap 34 prevents the entry of extraneous matter into the thrust bearing housing. As will be understood, upon removal of the handwheel from the stem and the cap from the bonnet body, the bearing assemblies and stem may be replaced or repaired. Also, and as well known in the art, the stem may be backed off to permit the stem to move upwardly to cause a shoulder 40 thereabout to engage an oppositely facing seat 41 in the upper end of the bonnet cavity at the lower end of opening 31, thereby providing a "backseat" seal.

As previously described, and as will be understood from the drawings, the upper end of the gate remains within the bonnet cavity 15 as it moves between opened and closed positions. More particularly, the side edges 41A of the gate are guidably movable within surfaces 42 formed on the open end of the bonnet cavity 15 as the gate is so moved, whereby the gate is prevented from moving laterally with respect to the flowway. As shown, the guide surfaces are formed on a cylindrical opening 42A of the cylindrical cavity 15 which forms the open end of the cavity. As previously described, this opening 42A may be machined as the bonnet is mounted on a chuck, as for example, when machining operations are being performed on side 26. As also previously described, the bonnet may be cast, or may be formed of bar stock. In either case, there is occasion for chucking the bonnet up for machining purposes in addition to the forming of the cylindrical opening 42.

Figure 3:
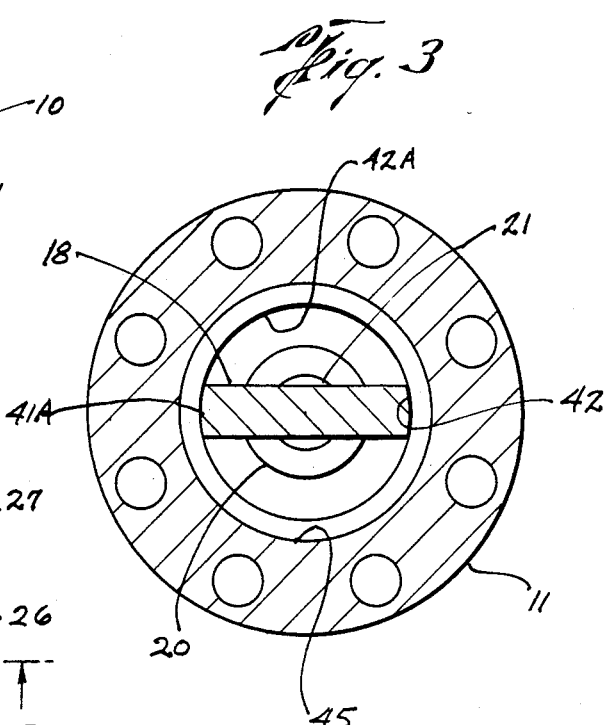
FIG. 3 is a cross-sectional view of the the valve, as seen along broken lines 3—3 of FIG. 2.

As shown in FIG. 3, the side edges 41A of the gate may be of arcuate configuration conforming to the circumference of opening 42A and thus the guide surfaces 42 on opposite sides of the opening. Alternatively, the side edges may be square, with their corners being slidable over the surfaces 42 for guiding purposes.

As also previously described, the low profile of the upper end of the valve body 11 also facilitates inspection of the seat pockets, as well as the replacement of the seats 24. Still further, and as will be understood from FIG. 2, the guiding of the side edges of the gate within the surfaces 42 formed in the bonnet makes it possible to leave an open space between the side edges of the gate and the opposite side walls of the body cavity 13, whereby there is free flow of lubricant past the seats within the body cavity as the gate moves between opened and closed positions.

As will be understood from FIG. 2, the gate is located in its open position by engagement of the upper end of slab 18 with the upper end 43 of the bonnet cavity. On the other hand, downward movement of the gate to its closed position is limited by engagement of a shoulder 41B on the lower end of the nut 20 with a surface 44 formed about the open upper end of the body cavity 13. Thus, the lower end of the gate may be spaced from the bottom of the cavity 13 in its lower position, as shown in FIG. 1, and there is no need to form stop surfaces on the body cavity, particularly at its lower end to limit downward movement of the gate.

The only machining which is required for the cast body 11, other than the forming of its flowway 12 and threads receive the pipe ends, is the forming of a cylindrical counterbore 45 for the open upper end of the cavity 13. As shown in FIG. 1, the end of the cylindrical counterbore provides the surface 44 against which the nut on the gate is engageable, as well as an outer cylindrical surface to receive a tubular extension 46 of the lower end of the bonnet and on the inner diameter of which cylindrical opening 42 is formed. As shown, the extension fits closely within the counterbore 45 and thus centers the open end of the bonnet cavity with that of the body cavity, and thus permits the bolt holes in the flange 28 in the bonnet to be lined up with the bolt sockets in the upper face 25 of the body 11. More particularly, a groove 47 is machined in the valve body at the intersection of the cylindrical counterbore 45 and the end face 25 to receive a seal ring 48 which is compressed by the tubular extension 46 into sealing engagement between the bonnet and the body as the bonnet is mounted on the body and bolted thereto. It will be understood in this respect that all of this machining occurs at very accessible areas at the open end of the cavity in the body. In this respect, the machining operation is like that which is necessary to form the cylindrical opening 42 in the open end of the bonnet cavity 15.

The ring 37 about the stem fits closely within the recess 34 in the housing formed by the cap 35 as well as closely about the stem so as to limit lateral movement of the stem during its rotation between the thrust bearings. In addition, a hole is formed diametrically through the ring 37 to receive a shear pin 50 through an aligned hole 51 formed in the stem. As previously described, and as will be understood from FIG. 2, the ring will thus rotate with the stem as long as no excessive axial loading is encountered. However, if such a load is encountered, as for example due to jamming of the gate, continued rotation of the handwheel will shear the pin 50 and thus prevent the ring from imposing excessive loading of the thrust bearings. On the other hand, and as also previously described, the stem is of sufficient size that it will ordinarily not twist off, at least under ordinary torsional loads. Obviously, however, if even more excessive torsional loads are applied to the handwheel, following shearing of the pin 50, the stem may twist off, probably along a plane passing through the shear pin 50 since this is the weakest section in the stem. The fact remains, however, that the stem is of a simplified one-piece construction, and further is adapted to be rendered inoperable to overload the thrust bearings at a predictable axial loading condition.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising an upright body having a flowway therethrough and a cavity therein intersecting the flowway and closed at its lower end and open at its upper end, a bonnet connected to the body and having a cavity therein which is closed at its upper end and open at its lower end which faces the upper end of the body cavity to form a continuation thereof, said body having a pocket therein at the intersection of the flowway with each side of the body cavity, a seat in each pocket aligned with the flowway, a gate having a port therethrough and mounted for sliding between the seats, a stem mounted within the bonnet cavity and extending through its upper end for connection to an operator, and means connecting the gate and stem for reciprocating the gate vertically within the body and bonnet cavities between positions in which the port is moved into and out of alignment with the seats in order to respectively open and close the flowway, the upper end of the gate remaining within the bonnet cavity as it moves between opened and closed positions, the lower end of the bonnet cavity having surfaces which guide the side edges of the gate, said body having an upwardly facing surface thereon adjacent the upper end of its cavity, and the gate having a shoulder for engaging with the surface as the gate moves to its lower positions, the gate including a slab in which the port is formed, the stem being mounted within the bonnet for rotation without reciprocation, the gate also including a nut mounted on the end of the slab and threadedly connected to the stem, the shoulder being formed on the nut, and the slab having a shoulder thereon engageable with a surface on the bonnet cavity as the gate moves to its upper position.

2. A gate valve, comprising an upright body having a flowway therethrough and a cavity therein intersecting the flowway and closed at its lower end and open at its upper end, a bonnet connected to the body and having a cavity therein which is closed at its upper end and open at its lower end which faces the upper end of the body cavity to form a continuation thereof, said body having a pocket therein at the intersection of the flowway with each side of the body cavity, a seat in each pocket aligned with the flowway, a gate having a port therethrough and mounted for sliding between the seats, a stem mounted within the bonnet cavity and extending through its upper end for connection to an operator, and means connecting the gate and stem for reciprocating the gate vertically within the body and bonnet cavities between positions in which the port is moved into and out of alignment with the seats in order to respectively open and close the flowway, the upper end of the gate remaining within the bonnet cavity as it moves between opened and closed positions, the lower end of the bonnet cavity having surfaces which guide the side edges of the gate, said body having an upwardly facing surface thereon adjacent the upper end of its cavity, the gate having a shoulder for engaging with the surface as the gate moves to its lower position, the upper end of the body cavity having a cylindrical counterbore, the surface being formed on the end of the counterbore, and the lower end of the bonnet having a cylindrical extension which fits closely within the counterbore.

3. A gate valve of the character defined in claim 2 wherein the body and bonnet have end faces which surround the open ends of their cavities for engaging one another upon connection of the body and bonnet, a groove is formed in the body at the intersection of its end face and the counterbore in the open end of its cavity, and a seal ring is received in the groove to seal between the body and bonnet.

* * * * *